US012612783B2

(12) United States Patent
Worrasangasilpa et al.

(10) Patent No.: US 12,612,783 B2
(45) Date of Patent: Apr. 28, 2026

(54) LAVATORY WITH MOVABLE PARTITION WALL

(71) Applicant: THE BOEING COMPANY, Arlington, VA (US)

(72) Inventors: Brian Danai Worrasangasilpa, Shoreline, WA (US); Darren Carl McIntosh, Mukilteo, WA (US); Noah Hunter Burton, Lee Summit, MO (US); Liam Holland, Lacey, WA (US); Christopher Kerry Young, Gig Harbor, WA (US); Kendall Marie Cox, Fife, WA (US); Travis Hoang Nguyen, Puyallup, WA (US); James Paul Mehlos, Everett, WA (US)

(73) Assignee: The Boeing Company, Arlington, VA (US)

( * ) Notice: Subject to any disclaimer, the term of this patent is extended or adjusted under 35 U.S.C. 154(b) by 239 days.

(21) Appl. No.: 18/458,845

(22) Filed: Aug. 30, 2023

(65) Prior Publication Data

US 2024/0167273 A1 May 23, 2024

Related U.S. Application Data

(60) Provisional application No. 63/384,818, filed on Nov. 23, 2022.

(51) Int. Cl.
| | |
|---|---|
| *E04B 2/82* | (2006.01) |
| *B64D 11/02* | (2006.01) |
| *B64F 5/10* | (2017.01) |
| *A47K 17/00* | (2006.01) |

(52) U.S. Cl.
CPC .............. *E04B 2/827* (2013.01); *B64D 11/02* (2013.01); *B64F 5/10* (2017.01); *A47K 17/00* (2013.01)

(58) Field of Classification Search
CPC ................................. A47K 17/00; E04B 2/827
See application file for complete search history.

(56) References Cited

U.S. PATENT DOCUMENTS

| | | | |
|---|---|---|---|
| 8,944,377 B2 | 2/2015 | McIntosh | |
| 2005/0125891 A1* | 6/2005 | Stratmann | ............. E04H 1/1216 |
| | | | 4/661 |
| 2014/0123571 A1* | 5/2014 | Swain | ................ B64D 11/0023 |
| | | | 29/401.1 |

FOREIGN PATENT DOCUMENTS

| | | |
|---|---|---|
| EP | 2974960 A1 | 1/2016 |
| EP | 2914492 A1 | 9/2017 |

OTHER PUBLICATIONS

Extended European Search Report for EP Patent Application No. 23210015.6 mailed Apr. 16, 2024 (11 pages).

* cited by examiner

*Primary Examiner* — Lauren A Crane
(74) *Attorney, Agent, or Firm* — Joseph M. Butscher; Carroll, Hoette & Butscher, LLC

(57) ABSTRACT

A lavatory includes a partition wall movable along a defined path between a deployed position in which the partition wall divides the lavatory into two discrete areas and a stowed position that defines a combined area in place of the two discrete areas. The partition wall translates along the defined path between the deployed position and the stowed position.

20 Claims, 10 Drawing Sheets

500

502

Install 1st track on ceiling

504

Install 2nd track on the ceiling

506

Mount partition wall to the 1st and 2nd tracks, the partition wall movable along a defined path between a deployed position and a stowed position

LAVATORY WITH MOVABLE PARTITION WALL

CROSS-REFERENCE TO RELATED APPLICATIONS

This application is a non-provisional conversion of, and claims priority to, U.S. Provisional Patent Application No. 63/384,818, which was filed on Nov. 23, 2022, and the entire disclosure of which is incorporated herein by reference.

FIELD OF THE DISCLOSURE

Embodiments of the present disclosure generally relate to reconfigurable rooms, such as lavatories, that have movable partition walls.

BACKGROUND OF THE DISCLOSURE

Some rooms have movable partition walls for reconfiguring the layout of the room for different purposes. For example, some systems enable selectively converting two individual lavatories into a single, combined lavatory by moving a partition wall. When the partition wall is deployed or extended to form the two discrete lavatories, efficiency is achieved by enabling a first party to use the first lavatory while a second party uses the second lavatory. However, each of the individual lavatories may be too narrow for a third party, such as a person with reduced mobility (PRM) or a parent with a child. A PRM may include various people with special needs, such as people in wheelchairs. Converting the dual lavatories into a single, combined lavatory by stowing the partition wall can provide a greater amount of space for parties that require the additional space.

Known systems for moving a partition wall to reconfigure the layout of a room, such as a lavatory, suffer from issues related to the difficulty and complexity of moving the partition wall between a retracted or stowed position and an extended or deployed position. The stowed position of the partition wall provides the larger combined space, and the deployed position of the partition wall provides the two discrete individual spaces. For example, the partition walls of known systems typically include multiple folds and hinges. Stowing the partition wall may require a complicated sequence of folding and movement that is difficult to comprehend and/or perform by a user. In addition to a lack of intuitiveness, the various hinges and folds introduce mechanical variables that may cause the partition wall to misalign with corresponding latches for securing the wall in the designated positions, and may prohibit the wall from fitting into designated slots. Besides being difficult to use, the reconfiguration of the partition wall may be relatively noisy due to rattling of the wall panels.

SUMMARY OF THE DISCLOSURE

A need exists for a reconfiguration system with a movable partition wall that transitions between stowed and deployed positions in an intuitive, easy-to-use, and reliable fashion than known systems, and may also have limited noise. A need may exist for a reconfiguration system that avoids folding or bending of the partition wall during the transition between stowed and deployed positions.

With those needs in mind, certain embodiments of the present disclosure provide a lavatory that includes a partition wall movable along a defined path between a deployed position in which the partition wall divides the lavatory into two discrete areas and a stowed position that defines a combined area in place of the two discrete areas. The partition wall translates along the defined path between the deployed position and the stowed position.

Certain embodiments of the present disclosure provide an aircraft that includes a lavatory. The lavatory includes a first toilet, a second toilet, and a partition wall that is configured to translate along a defined path between a deployed position and a stowed position. The partition wall in the deployed position is disposed between the first and second toilets. When the partition wall is in the stowed position, the first toilet is disposed between the partition wall and the second toilet to provide a larger open space relative to when the partition wall is in the deployed position.

Certain embodiments of the present disclosure provide a method that includes installing a first track on a ceiling of a lavatory and installing a second track on the ceiling of the lavatory. The method includes mounting a partition wall to the first track and the second track such that the partition wall is movable along a defined path that is defined by the first and second tracks. The partition wall is movable along the defined path between a deployed position and a stowed position. The partition wall in the deployed position is configured to divide the lavatory into two discrete areas. The partition wall in the stowed position is configured to define a combined area in place of the two discrete areas.

BRIEF DESCRIPTION OF THE DRAWINGS

These and other features, aspects, and advantages of the present disclosure will become better understood when the following detailed description is read with reference to the accompanying drawings in which like numerals represent like parts throughout the drawings, wherein.

DETAILED DESCRIPTION OF THE DISCLOSURE

Figure 1:
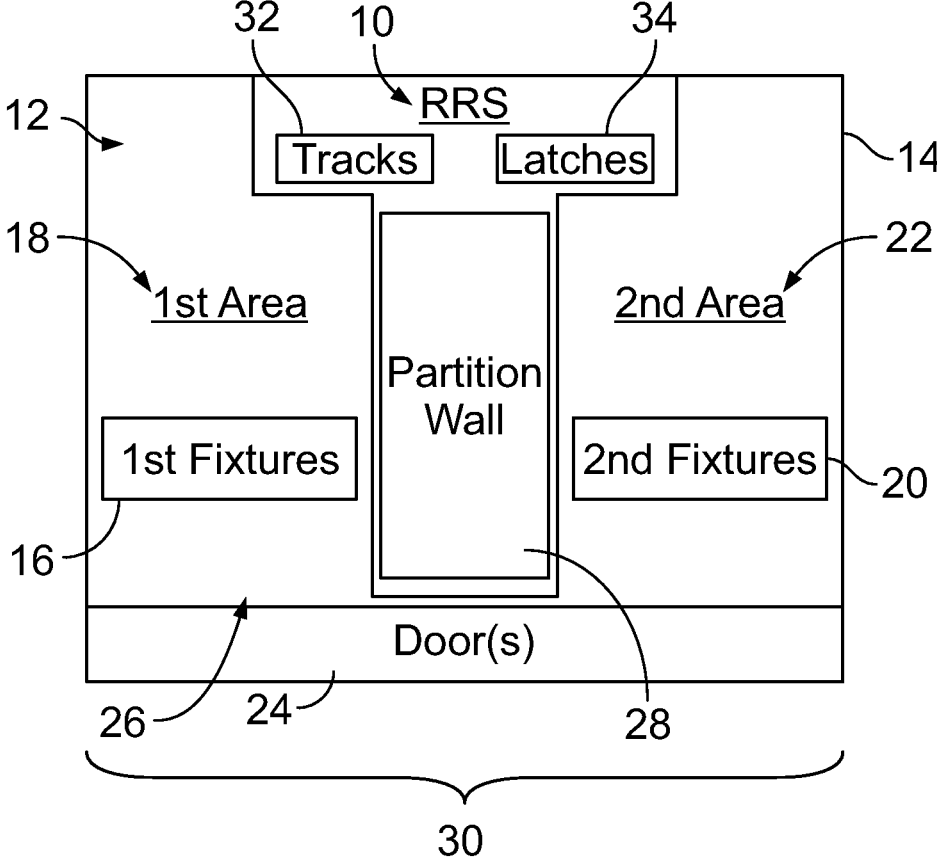
FIG. 1 is a block diagram showing a room reconfiguration system installed within a room according to an embodiment.

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition can include additional elements not having that condition.

Examples of the present disclosure provide a reconfiguration system that selectively partitions a room between two discrete areas and a single combined area by movement of a partition wall. The reconfiguration system defines a fixed path for the partition wall to move, relative to the room, between a deployed position and a stowed position. In the deployed position, the partition wall divides the room into two individual areas. In the stowed position, the partition wall defines a single, combined area within the room, which is larger than each of the two individual areas. For example, the combined area may be approximately the size of both individual areas combined. The combined area may occupy approximately the same footprint as the two individual areas. For example, the same space may transition between the two individual areas and the combined area based on the position of the partition wall.

The reconfiguration system of the embodiments described herein may be more intuitive and easier to use than other systems. For example, in at least one embodiment, the partition wall moves along a defined path between the deployed position and the stowed position without bending or folding. For example, a person may manually transition the partition wall from the deployed position to the stowed position, and vice-versa, without folding any portion of the partition wall relative another portion of the partition wall. The partition wall may be mounted to tracks that define the path of movement for the partition wall. In an embodiment, one or more of the tracks are mounted to a ceiling of the room. Additional tracks may be mounted to a floor of the room. A person may transition the partition wall by pushing and/or pulling the partition wall to move along the prescribed path defined by the tracks, which may be more intuitive than a sequence of folding and movement operations. The reconfiguration system described herein may enable efficient transitions between the dual and single area configurations, and the transitions may be relatively quiet. Furthermore, because the partition wall is secured to fixed tracks, the movement of the partition wall is precise and repeatable, allowing for reliable operation. For example, there may be low risk of misalignment between the partition wall and corresponding latch members, slots along room walls, and/or the like.

FIG. 1 is a block diagram showing a room reconfiguration system 10 ("RRS" in FIG. 1) installed within a room 12 according to an embodiment. The room 12 has a perimeter 14 that defines the space within the room. The room 12 includes a first set of fixtures 16 within a first area 18 of the room 12, and a second set of fixtures 20 within a second area 22 of the room 12. The fixtures 16, 20 may include features that are installed within the room 12. In a lavatory setting, the fixtures 16, 20 may include a toilet, a washbasin, a lamp, a mirror, a vanity, a wastebasket, and/or the like. The toilet as used herein may include any sanitary hardware to receive human waste, such as toilets and urinals. Optionally, at least some of the fixtures 16 in the first set may be the same as fixtures 20 in the second set. For example, the first area 18 may define a first individual lavatory that includes a first toilet and a first washbasin, and the second area 22 may define a second individual lavatory that includes a second toilet and a second washbasin. The room 12 may include one or more doors 24 that selectively block an entryway 26 into the room 12. In an embodiment, the one or more doors 24 include a first door that aligns with the first area 18 and a second door that aligns with the second area 22. A person can enter the first area 18 through the first door, without entering the second area 22 or opening the second door. In an alternative embodiment, the room 12 may lack the one or more doors 24.

The room reconfiguration system 10 (also referred to herein simply as reconfiguration system) includes a partition wall 28 that is movable between a deployed position and a stowed position to reconfigure the layout and use of the room 12. The partition wall 28 in the deployed position extends between and separates the first and second areas 18, 22. In an embodiment in which the room 12 is a restroom (e.g., lavatory), the partition wall 28 in the deployed position divides the first individual lavatory from the second individual lavatory, which enables concurrent, private use of the first and second lavatories by different people. The one or more doors 24, when closed, may contact a proximal end of the partition wall 28.

The partition wall 28 in the stowed position may not extend between or separate the first and second areas 18, 22. When stowed, the partition wall 28 is out of the space between the two areas 18, 22, and defines a single, combined area 30 within the room 12. The combined area 30 represents a larger open space than when the partition wall 28 is in the deployed position, defining a larger stall or compartment to accommodate families, wheelchairs, and PRM. The combined area 30 may include all or at least most of each of the first area 18 and the second area 22. For example, at least some of the first fixtures 16 and at least some of the second fixtures 20 may be disposed within the combined area 30. The combined area 30 is referred to herein as a combined area because it combines at least most of the first and second individual areas 18, 22.

The reconfiguration system 10 enables the room 12 to quickly, efficiently, and reversibly change between a divided configuration and an open configuration. The partition wall 28 is deployed in the divided configuration, and the partition wall 28 is stowed in the open configuration. In an embodiment, the perimeter 14 of the room 12 may be fixed, such that the perimeter 14 does not change regardless of the configuration. For example, the footprint of the room 12 may not increase or decrease as the partition wall 28 is moved between the two positions. In an alternative embodiment, a portion of the partition wall 28 and/or a portion of the one or more doors 24 may project outward beyond the entryway 26 (e.g., an entry threshold) of the room 12 when in one of the configurations and/or as the partition wall 28 is moving between the two positions.

In addition to the partition wall 28, the reconfiguration system 10 may include one or more track assemblies 32

("tracks" in FIG. 1) that support and guide the partition wall 28. Each track assembly 32 may include a track and a corresponding runner that mounts to each of the track and the partition wall 28 to secure the partition wall 28 to the track. In an embodiment, the reconfiguration system 10 may include at least two track assemblies 32 coupled to the partition wall 28. The track assemblies 32 define a pre-scribed or defined path of movement for the partition wall 28, restricting the partition wall 28 from movement outside of or beyond the prescribed path. In an embodiment, two of the track assemblies 32 coupled to the partition wall 28 are different from one another. For example, the shape of the track of a first track assembly 32 may be different from the shape of the track of a second track assembly 32.

The reconfiguration system 10 may include one or more latch assemblies 34 ("latches" in FIG. 1) that secure and retain the partition wall 28 in place in the deployed and/or stowed positions. For example, the latch assemblies 34 may prohibit unintentional and undesired movement of the par-tition wall 28 along the defined path between the deployed and stowed positions. The latch assemblies 34 may include first latch members that interact with corresponding second latch members. For example, the first and second latch members may have complementary shapes and/or features that enable the first and second latch members to secure to one another. The first latch members may be affixed to the partition wall 28, and the second latch members may be affixed to at least one wall that defines the room 12. For example, the second latch members may be affixed to a ceiling of the room 12, a floor of the room 12, a side wall of the room 12, the one or more doors 24, or the like. When the partition wall 28 reaches the deployed position, one or more of the first latch members may interact with a first set of the second latch members to retain the partition wall in the deployed position. In an example, a person may overcome the retention provided by the latch assemblies 34 by exerting a push or pull force on the partition wall 28 in excess of a retention force provided by the latch assemblies 34. In another example, a person may disconnect or uncouple the latch assemblies 34 by actuating a handle or lever which causes the first latch members to separate from the second latch members. A second set of the second latch members may interact with the same first latch members or different first latch members on the partition wall 28 when the partition wall 28 achieves the stowed position to secure the partition wall 28 in the stowed position. In an alternative embodiment, the room reconfiguration system 10 does not include the latch assemblies 34.

Figure 2:
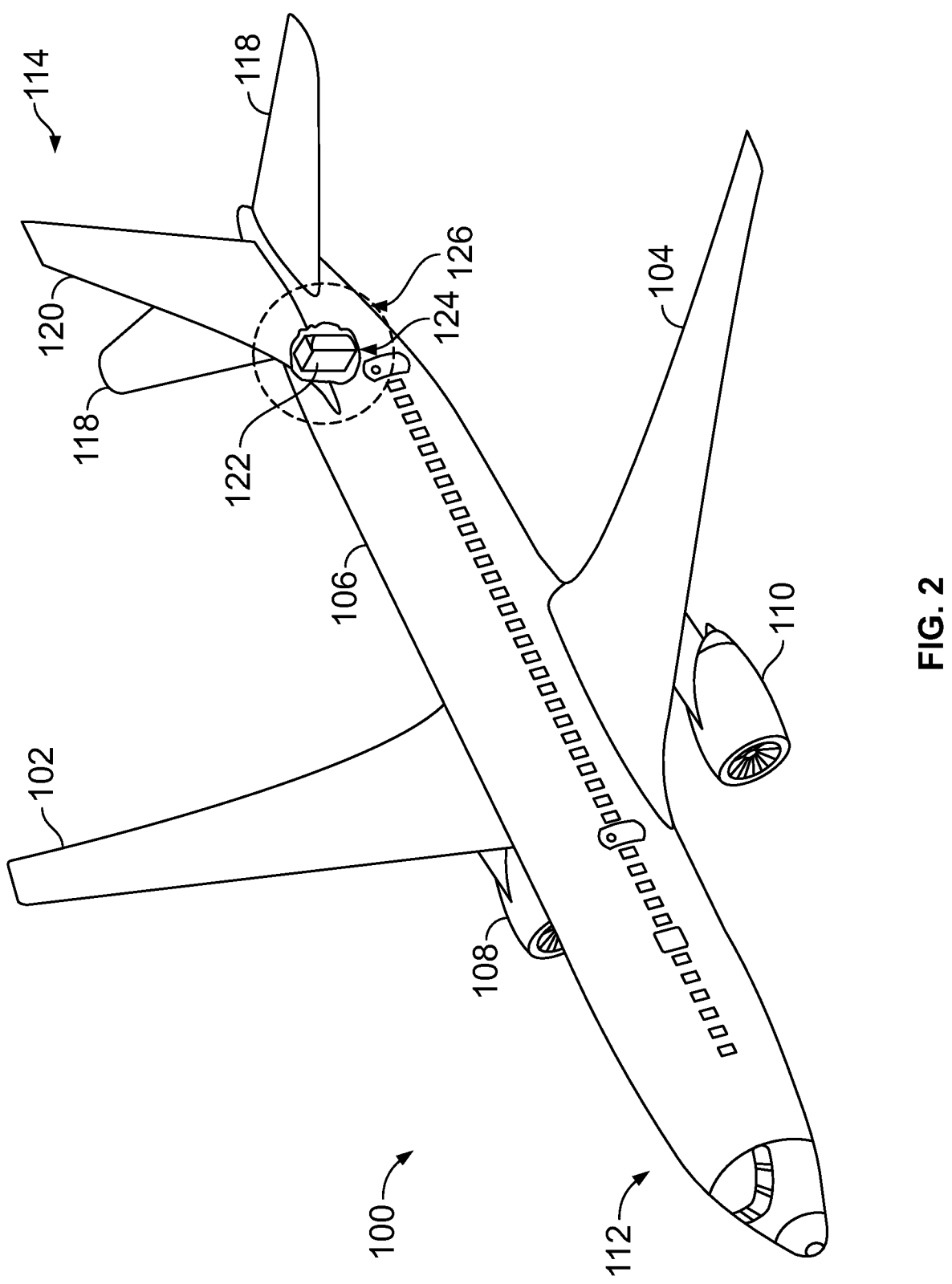
FIG. 2 is a perspective illustration of an aircraft onto which the room reconfiguration system may be installed.

FIG. 2 illustrates an aircraft 100 onto which the room reconfiguration system 10 may be installed. The aircraft 100 includes a fuselage 106 extending from a nose section 112 to an empennage 114 or tail section. The aircraft 100 includes a pair of wings 102, 104 extending from the fuselage 106. The wings 102, 104 may include movable wing surfaces, such as ailerons, flaps, and/or spoilers. One or more propulsion systems 108, 110 propel the aircraft 100. The propulsion systems 108, 110 are supported by the wings 102, 104 of the aircraft 100 in the illustrated embodiment, but may be mounted to the fuselage 106 or empennage 114 in other types of aircraft. The empennage 114 may include horizontal stabilizers 116, 118 and a vertical stabilizer 120.

The section 121 identified in FIG. 2 depicts an interior region 122 of a passenger cabin 124 within the fuselage 106. The aircraft 100 may include a room 126 within the interior region 122. The room reconfiguration system 10 described in FIG. 1 may be installed within the room 126. In an example, the room 126 is a restroom (e.g., lavatory), and the partition wall 28 may selectively divide two lavatory areas. The room 126 may be a different type of room 126 in an alternative embodiment, such as a sleeping compartment, a crew rest area, a galley, a first class passenger compartment, or the like.

Although the room reconfiguration system 10 is described as being installed onboard an aircraft 100 in FIG. 2, the room reconfiguration system 10 may be implemented on various other types of vehicles and even installed in non-vehicle applications. For example, the room reconfiguration system 10 may be implemented on other passenger vehicles, such as rail-based trains, marine vessels, buses, and/or the like. The room reconfiguration system 10 may also be implemented in buildings, such as offices, schools, theatres, arenas, places of worship, and residences.

Figure 3:
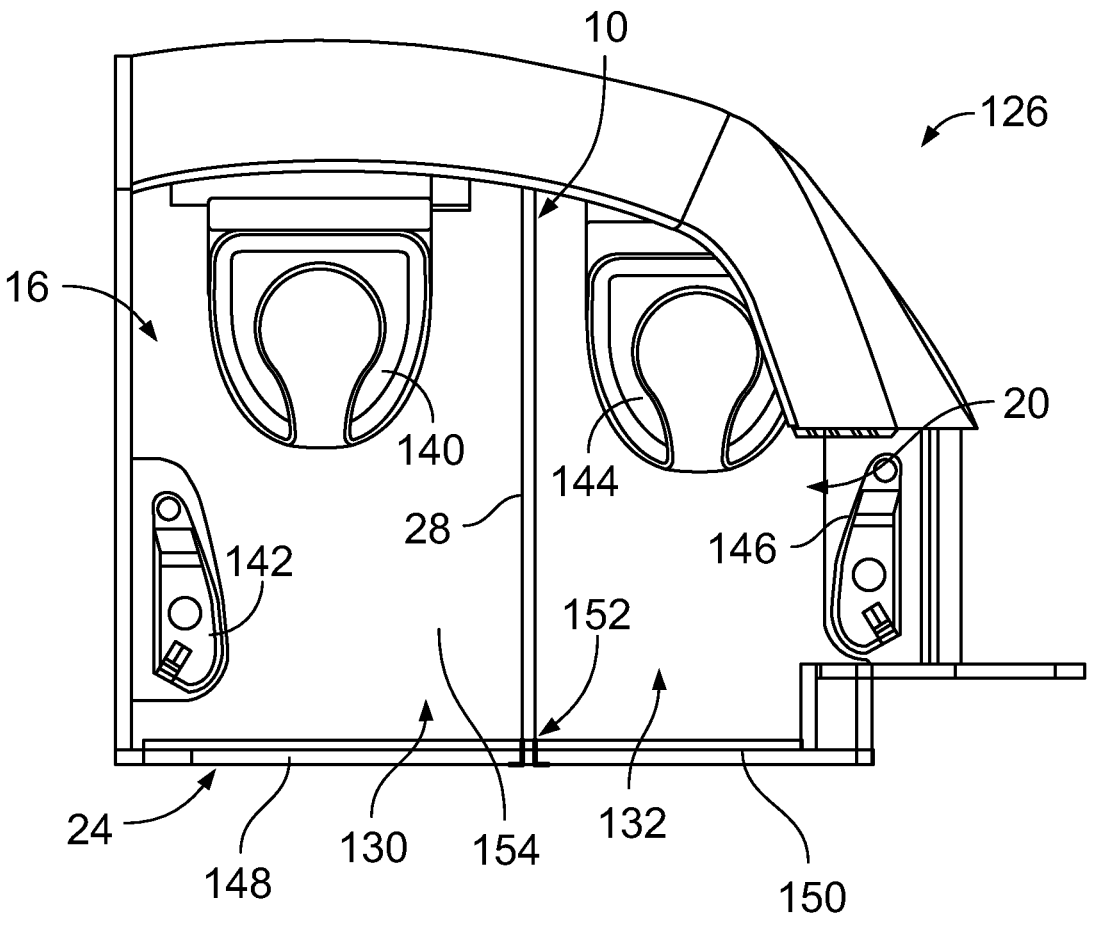
FIG. 3 illustrates a plan view of a room of the aircraft shown in FIG. 2.

FIG. 3 illustrates a plan view of the room 126 of the aircraft 100 shown in FIG. 2. In the illustrated embodiment, the room 126 is a restroom (e.g., lavatory). The restroom 126 includes a first lavatory area 130 and a second lavatory area 132. The partition wall 28 of the reconfiguration system 10 is in the deployed position and separates the first and second lavatory areas 130, 132. The first fixtures 16 in the first lavatory area 130 include a first toilet 140 and a first washbasin 142. The second fixtures 20 in the second lava-tory area 132 include a second toilet 144 and a second washbasin 146. A first door 148 of the doors 24 selectively restricts access to the first lavatory area 130. A second door 150 of the doors 24 selectively restricts access to the second lavatory area 132. When in the divided configuration as shown in FIG. 3, a first party can use the first lavatory area 130 via the first door 148 without disturbing a second party that uses the second lavatory area 132 via the second door 150. The first and second doors 148, 150 are both closed in FIG. 3. When closed, the doors 148, 150 may contact a proximal end 152 of the partition wall 28. Although not shown in FIG. 3, the partition wall 28 may extend a full height of the restroom 126 from a floor 154 to a ceiling 303 (shown in FIG. 8) of the restroom 126, or at least a substantial majority of the height (e.g., over 90% or over 95%) for privacy between the parties in the adjacent lava-tories.

Figures 4, 5:
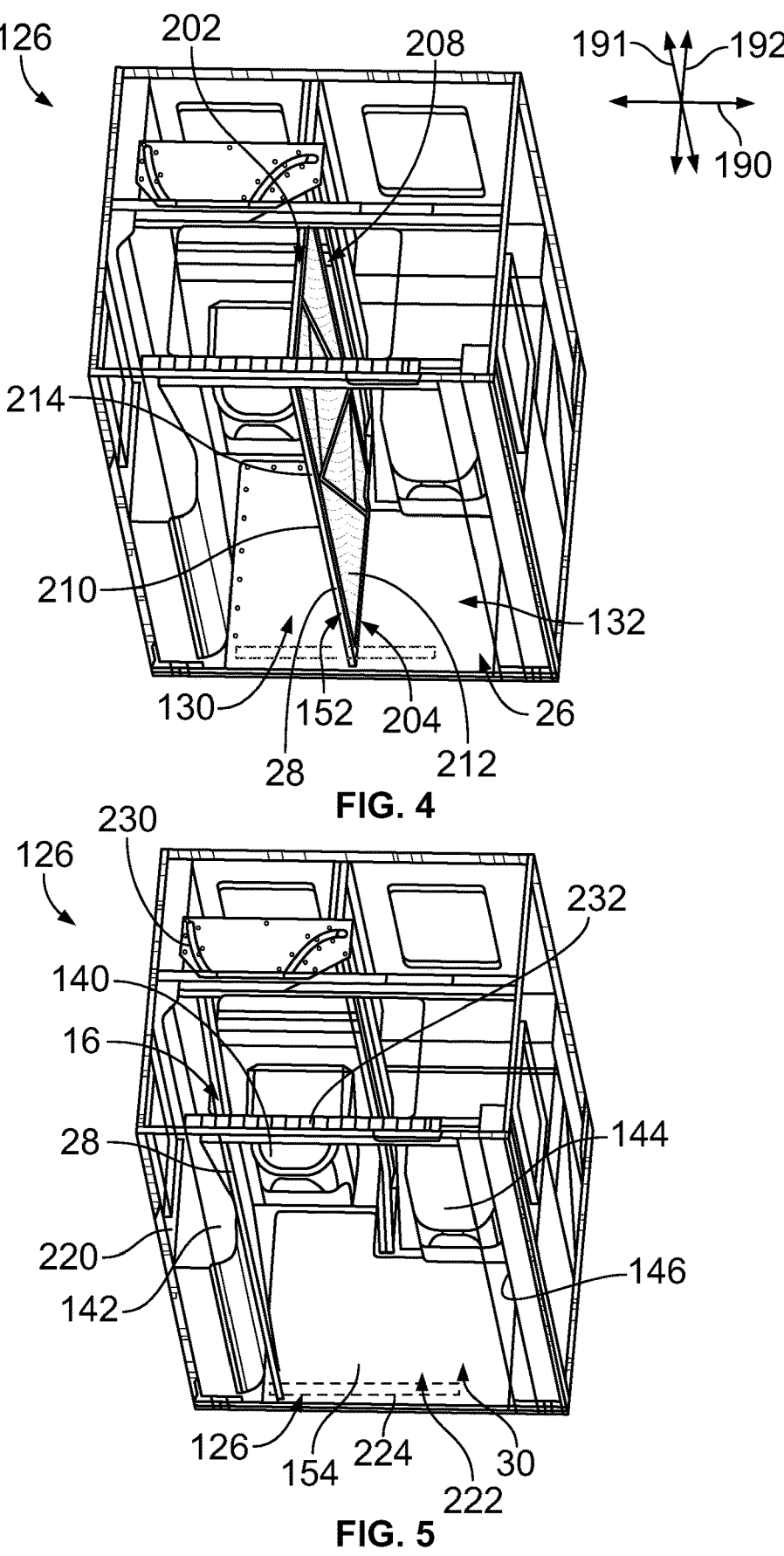
FIG. 4 is a perspective view of a restroom showing a partition wall of the room reconfiguration system in a deployed position according to an embodiment.
FIG. 5 is a perspective view of the restroom showing the partition wall of the room reconfiguration system in a stowed position according to an embodiment.

FIG. 4 is an isometric view of the restroom 126 showing the partition wall 28 of the reconfiguration system 10 in the deployed position according to an embodiment. The rest-room 126 is oriented about a lateral axis 190, a vertical or height axis 191, and a longitudinal or depth axis 192. The axes 190-192 are mutually perpendicular.

The partition wall 28 may vertically extend (along the vertical axis 191) from a top end 202 of the partition wall 28 to a bottom end 204 of the partition wall 28. The partition wall 28 may longitudinally extend (along the longitudinal axis 192) from the proximal end 152 of the partition wall 28 to a distal end 208 of the partition wall 28. The proximal end 152 is closer to the entryway 26 and the area outside of the restroom 126 beyond the entryway 26, than the proximity of the distal end 208 to the entryway 26. The proximal end 152 may be a forward or inboard end, and the distal end 208 may be an aft or outboard end. The partition wall 28 may have a thickness or width (along the lateral axis 190) that extends from a first side 210 of the partition wall 28 to a second side 212 of the partition wall 28. The first side 210 faces and partially defines the first lavatory area 130. The second side 212 faces and partially defines the second lavatory area 132.

The partition wall 28 may have a rigid construction that does not bend or fold during ordinary use of the reconfigu-ration system 10. In an example, the partition wall 28 does not include any (e.g., is free of) fold lines or hinges between two sections of the partition wall 28. For example, no portion of the partition wall 28 may be designed to fold relative to another portion of the partition wall 28. The partition wall 28 may include a body panel 214 that continuously extends from the top end 202 to the bottom end 204 and continuously extends from the proximal end 152 to the distal end 208. The body panel 214 may be composed of wood, metal, a rigid plastic, a composite material, or the like. In an embodiment, the partition wall 28 has a unitary, monolithic body, such that body panel 214 defines the entire partition wall 28. For example, the partition wall 28 may be a single, solid body panel 214. Optionally, the body panel 214 may define one or more cut-out areas to reduce weight. The cut-out area(s) may be filled by a lightweight panel and/or material, such as insulation. In an alternative embodiment, the partition wall 28 may include multiple body panels, with the body panels secured to each other such that the body panels do not fold relative to one another.

FIG. 5 is an isometric view of the restroom 126 showing the partition wall 28 of the reconfiguration system 10 in the stowed position according to an embodiment. In the illustrated embodiment, the partition wall 28 in the stowed position is located proximate to a side wall 220 of the restroom 126. The side wall 220 is adjacent to the entryway 26 in FIG. 5. When the partition wall 28 is stowed, the restroom 126 has a single, combined area 30, which is referred to herein as an enlarged lavatory area 222.

The partition wall 28 in the stowed position is not located between the first and second toilets 140, 144. For example, the first toilet 140 is disposed between the partition wall 28 and the second toilet 142. With the partition wall 28 stowed, the floor 154 of the lavatory 12 may lack any obstruction between the toilets 140, 144 that could impede movement of a wheelchair or present a tripping hazard. For example, some known systems include a small, immovable base wall that is between the toilets, and the moveable partition wall engages the base wall when in the deployed position. The immovable base wall may impede movement of a wheelchair and may represent a tripping hazard when the movable partition wall is stowed. The lavatory of the present disclosure may avoid these issues by omitting the small, immovable base wall and any other obstructions between the toilets 140, 144 that could impede movement of the people within the lavatory. The floor 154 between the toilets 140, 144 may be flat. Although the partition wall 28 may obstruct access to and/or use of one or more of the first fixtures 16, such as the first toilet 140 and the first washbasin 142, the party using the enlarged lavatory area 222 has full access to the second toilet 144 and the second washbasin 146 with additional space provided by the stowed partition wall 28. The enlarged lavatory area 222 may provide additional space for certain types of passengers, such as families, passengers with reduced mobility, and the like.

In an embodiment, the partition wall 28 remains within the footprint of the restroom 126 in both the stowed and deployed positions. For example, the partition wall 28 does not protrude beyond the entryway 26 in either position. In an embodiment, the partition wall 28 does not project out of the restroom 126 during movement between the stowed and deployed positions. As such, the perimeter of the restroom 126 may be fixed, so the restroom 126 can be reconfigured without interfering with people and/or objects outside of the restroom 126.

In various embodiments described herein with reference to FIGS. 7 through 14, the partition wall 28 may be supported by one or more tracks 230, 232 mounted to the ceiling of the restroom 126. For example, the partition wall

28 may be suspended from the ceiling and may move between the stowed and deployed positions via the one or more tracks 230, 232 which define a movement path. In an embodiment, the restroom 126 may include a magnetic track 224 along the floor 154. The magnetic track 224 is shown in phantom because the hardware components of the magnetic track 224 may be covered by one or more floor panels (e.g., tiles, planks, etc.), a floor mat, a carpet, and/or the like. The partition wall 28 may include at least one magnet 226 (shown in FIG. 6) installed along the bottom end 204 of the partition wall 28 to interact with a ferrous material in the magnetic track 224. The magnet 226 may be located proximate to the proximal end 152 of the partition wall 28. The interaction between the magnet 226 and the ferrous material may restrain pendulum movement of the bottom end 204 of the partition wall 28 relative to the top end 202, particularly as the partition wall 28 is moved between the stowed and deployed positions. The ferrous material may be located along the length of the magnetic track 224. Attraction forces may cause the magnet 226 to align with and stay directly above the ferrous material, even as the partition wall 28 is moved between the stowed and deployed positions.

The magnetic track 224 may be linear as shown in FIG. 5, or alternatively may have a non-linear path between its first and second ends. For example, the magnetic track 224 may have a non-linear shape that corresponds to a travel path of the proximal end 152 of the partition wall 28 during movement between the stowed and deployed positions. In an example, the magnetic track 224 may have a shape similar to the second track 422 shown in FIG. 12. The magnetic track 224 beneficially supports the bottom end 204 of the partition wall 28 without requiring the floor 154 to have any channel or recess which could accumulate liquids, dirt, and other contaminants. Furthermore, the magnetic track 224 avoids hardware located on and above the standing surface of the floor 154, and therefore does not represent a tripping hazard to people in the restroom 126.

Figure 6:
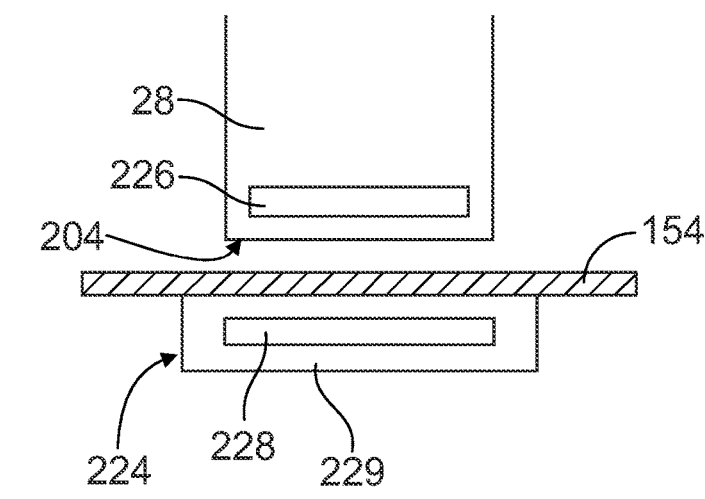
FIG. 6 is a schematic diagram showing an interface between a bottom end of the partition wall and a magnetic track according to an embodiment.

FIG. 6 is a schematic diagram showing the interface between the bottom end 204 of the partition wall 28 and the magnetic track 224 according to an embodiment. The magnet 226 is embedded in the partition wall 28. The magnetic track 224 is recessed under the floor 154 of the restroom 126. The element of the floor 154 shown in FIG. 6 may be a structural panel, a floor mat, a carpet, or the like. The magnetic track 224 includes ferrous material 228. The ferrous material 228 may be surrounded by a corrosion resistant coating 229. The magnetic track 224 may interact with the magnet 226 in the partition wall 28 without physically contacting the partition wall 28 or the magnet 226. For example, the partition wall 28 may be suspended above the floor 154 without contacting the floor 154.

Figure 7:
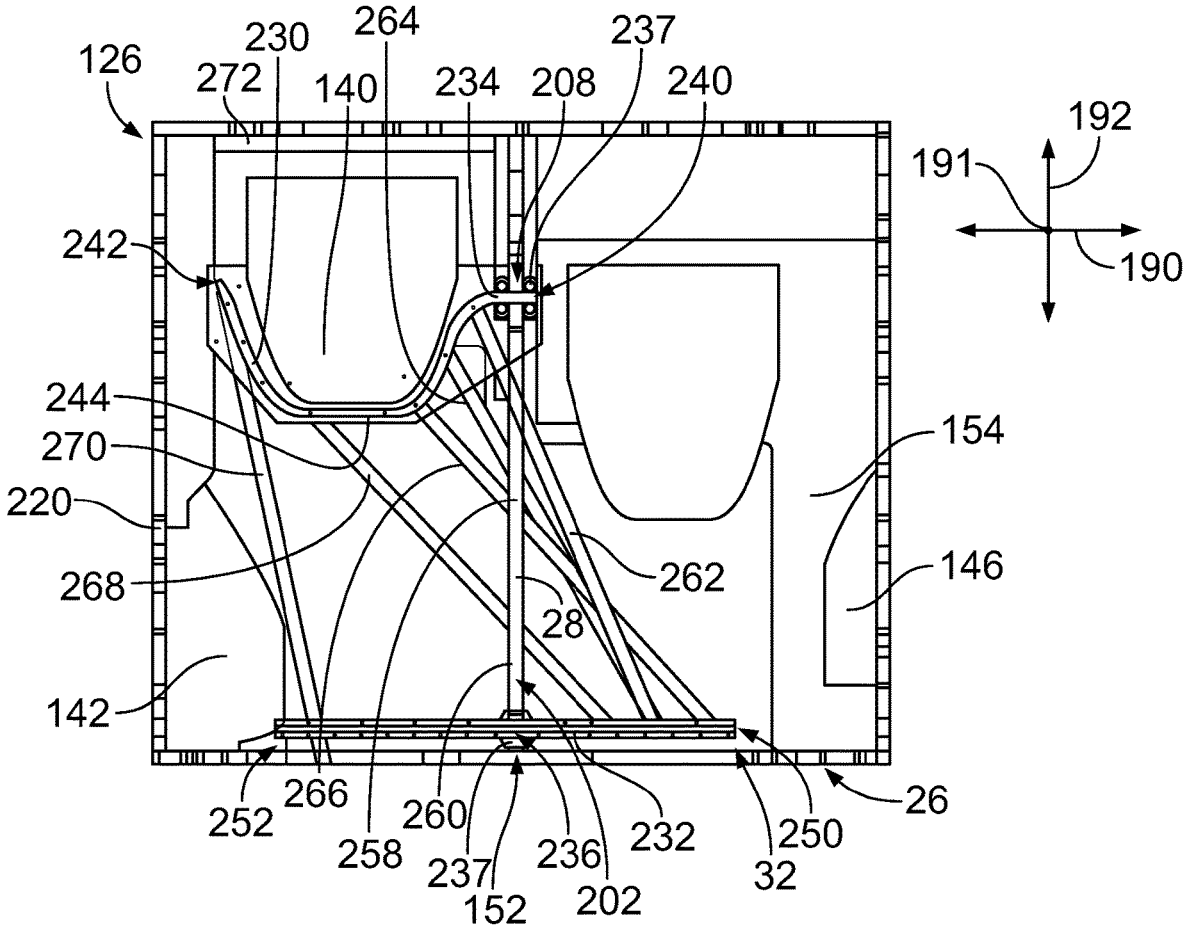
FIG. 7 is a plan view of the restroom showing a sequence of instantaneous positions of the partition wall over time during movement between the stowed position and the deployed position according to an embodiment.

FIG. 7 is a plan view of the restroom 126 showing a sequence of instantaneous positions of the partition wall 28 over time during movement between the stowed position and the deployed position according to an embodiment. In the illustrated embodiment, the partition wall 28 is movable along a defined path that is controlled by a first track 230 and a second track 232 of the track assemblies 32. The first track 230 is coupled to the partition wall 28 at or proximate to the distal end 208. The second track 232 is coupled to the partition wall 28 at or proximate to the proximal end 152. In an embodiment, the first and second tracks 230, 232 are mounted to a ceiling of the restroom 126 and couple to the partition wall 28 at or proximate to the top end 202 (shown in FIG. 4). The partition wall 28 may be suspended by the tracks 230, 232. Optionally, at least a third track may be coupled to the partition wall 28 at or proximate to the bottom end 204 (shown in FIG. 4) to restrict the partition wall 28 from swaying. For example, the reconfiguration system 10 may include a third track and a fourth track at the floor 154. The third track may align with the first track 230 and may have a shape that matches the first track 230. The fourth track may align with the second track 232 and have a shape that matches the second track 232. Only the first and second tracks 230, 232 are visible in the plan view of FIG. 7.

The partition wall 28 is coupled to the first track 230 at a first connection point 234, and is coupled to the second track 232 at a second connection point 236. The first and second connection points 234, 236 may be defined by corresponding runners 237 of the track assemblies 32. In an embodiment, the partition wall 28 is pivotable (e.g., rotatable) at each of the first and second connection points 234, 236. The pivotable connection points 234, 236 may enable the partition wall 28 to rotate about a vertical axis 258 of the partition wall 28. The vertical axis 258 may be parallel to the vertical axis 191, and perpendicular to the lateral axis 190 and the longitudinal axis 192 when the partition wall 28 is installed in the restroom 126.

The first track 230 extends from a first end 240 of the first track 230 to a second end 242 of the first track 230 that is opposite the first end 240. The first end 240 is referred to herein as a right end, and the second end 242 is referred to as a left end. In the illustrated embodiment, the first track 230 is non-linear. The first track 230 may be shaped and positioned relative to fixtures in the restroom 126 to allow the partition wall 28 to avoid contacting the fixtures. As the partition wall 28 is moved along the first track 230, the first track 230 may cause the partition wall 28 to translate around a contour of at least one fixture in the room without contacting the at least one fixture. For example, the first track 230 may have a curved section 244 that corresponds to the first toilet 140. The curved section 244 may cause the distal end 208 of the partition wall 28 to translate around a contour of a front portion of the first toilet 140 without contacting first toilet 140.

The second track 232 extends from a first end 250 of the second track 232 to a second end 252 of the second track 232 that is opposite the first end 250. The first end 250 is referred to herein as a right end, and the second end 252 is referred to as a left end. In an embodiment, the second track 232 has a different shape than the first track 230. For example, the second track 232 may lack a curved section. In the illustrated embodiment, the second track 232 may be linear along at least a majority of the length between the two ends 250, 252. Optionally, the second track 232 may be linear along the entire length. The second track 232 may extend parallel to the lateral axis 190 of the restroom 126 (e.g., parallel to the entryway 26). The second track 232 may be located proximate to the doors 148, 150 shown in FIG. 3. For example, the second track 232 may be located between the first track 230 and the doors 148, 150 at the entryway 26.

The defined path provided by the first and second tracks 230, 232 may cause the partition wall 28 to both translate and rotate (e.g., pivot) during movement of the partition wall 28 between the stowed and deployed positions. For example, the partition wall 28 may translate parallel to the lateral axis 190 (e.g., parallel to the entryway 26 and/or parallel to the second track 232). The partition wall 28 may pivot about the vertical axis 258 of the partition wall 28. The pivoting of the partition wall 28 may be enabled by rotation at the respective connection points 234, 236 to the tracks 230, 232. In an embodiment, as the partition wall 28 is moved, the partition wall 28 may concurrently translate and rotate.

A first instantaneous position 260 of the partition wall 28 in FIG. 7 represents the deployed position. In the deployed position, the partition wall 28 may extend parallel to the longitudinal axis 192 (perpendicular to the entryway 26 and/or perpendicular to the second track 232). The first connection point 234 may be disposed at or proximate to the right end 240 of the first track 230. The second connection point 236 may be disposed at a middle region of the second track 232. The latches 34 (shown in FIG. 1) may retain the partition wall 28 in the deployed position. The following sequence describes the transition from the deployed position to the stowed position.

Optionally, the partition wall 28 may be secured in place in the deployed position by the latch assemblies 34, a detent, magnets, a slot in the back wall 272, or the like. The partition wall 28 may be secured in the deployed position to avoid unintentional movement of the partition wall 28 towards the stowed position. A person may apply force to the partition wall 28 itself, to a latch member, and/or to a handle to unlock or release the partition wall 28 from the deployed position to initiate the transition to the stowed position. Optionally, one or more latches, detents, magnets, slots, or the like may secure the partition wall 28 in the stowed position to avoid unintentional movement of the partition wall 28 towards the deployed position. In an example, the latch assemblies 34 may include at least one pin that is mounted to the partition wall 28 and is selectively movable relative to the partition wall 28 by actuation of a handle or lever on the partition wall 28. For example, a first pin may protrude beyond the top end 202 of the partition wall 28 and be received within a catch device mounted along the ceiling of the restroom 126 when the partition wall 28 is secured in the deployed position. Optionally, a second pin may protrude beyond the bottom end 204 of the partition wall 28 and be received within a second catch device along the floor 154. To release the partition wall 28 from the deployed position, a person may grasp the handle or lever and pull or rotate the handle or lever to actuate the handle or lever. The actuation of the handle or lever may retract the first and second pins into the partition wall 28, disconnecting the pins from the corresponding catch devices and allowing the partition wall 28 to slide along the tracks 230, 232.

A second instantaneous position 262 of the partition wall 28 is a first intermediate position that is subsequent to the first instantaneous position 260. The first step in the sequence involves applying torque to the partition wall 28 to pivot the partition wall 28 about the vertical axis 258 of the partition wall 28. The partition wall 28 may be pivoted in a first rotational direction (e.g., counterclockwise in the top down view shown in FIG. 7) such that the proximal end 152 translates to the right (e.g., towards the second washbasin 146) along the second track 232 and the distal end 208 translates to the left (e.g., towards the first toilet 140) along the first track 230. The partition wall 28 may rotate counterclockwise about the vertical axis 258 of the partition wall 28. The partition wall 28 may be moved by a person grasping an edge of the partition wall 28 along the proximal end 152 and an edge along the distal end 208 and applying force on the partition wall 28. Alternatively, the partition wall 28 may have one or more handles mounted to it, and the person may grasp the handle(s) to apply force to the partition wall 28 for moving the partition wall 28 towards the stowed position. In an alternative embodiment, a mechanical actuator may be installed along at least one of the tracks 230, 232 to automatically propel the partition wall 28 towards the stowed position when triggered. The triggering event may be a person releasing the partition wall 28 from the deployed position, a person pressing a button on an input device, or the like. The mechanical actuator may be a motor-driven device, a biasing element (e.g., a spring), or the like.

A third instantaneous position 264 of the partition wall 28 is a second intermediate position that is subsequent to the first intermediate position (e.g., the second instantaneous position 262). The proximal end 152 of the partition wall 28 continues to move to the right towards the right end 250 of the second track 232, and the distal end 208 continues to move towards the left towards the left end 242 of the first track 230. The distal end 208 begins to travel along the curved section 244 of the first track 230.

A fourth instantaneous position 266 of the partition wall 28 is a third intermediate position that is subsequent to the second intermediate position (e.g., the third instantaneous position 264) in the sequence. The proximal end 152 of the partition wall 28 is disposed at or proximate to the right end 250 of the second track 232. The distal end 208 is disposed along the curved section 244. The distal end 208 may be located at a portion of the curved section 244 that is closest to the second track 232.

A fifth instantaneous position 268 of the partition wall 28 is a fourth intermediate position that is subsequent to the third intermediate position (e.g., the fourth instantaneous position 266). The movement of the partition wall 28 from the fourth instantaneous position 266 to the fifth instantaneous position 268 is essentially linear translation toward the left (e.g., towards the first washbasin 142 and the first side wall 220). For example, the movement may be parallel to the entryway 26 and/or parallel to the orientation of the second track 232. The tilt or rotation orientation of the partition wall 28 may be essentially constant from the fourth position 266 to the fifth position 268. The orientation of the partition wall 28 at this stage may be transverse to the orientation of the partition wall 28 in the deployed position.

A sixth instantaneous position 270 of the partition wall 28 represents the stowed position. In the stowed position, the proximal end 152 of the partition wall 28 is at or proximate to the left end 252 of the second track 232, and the distal end 208 of the partition wall 28 is at or proximate to the left end 242 of the first track 230. In the illustrated example, the partition wall 28 is not flush against the side wall 220 due at least in part to obstruction by the first washbasin 142. The partition wall 28 may be closer to the side wall 220 in the stowed position than in any of the other instantaneous positions. The partition wall 28 in the stowed position is offset a considerable distance from the deployed position of the partition wall 28, which significantly enlarges the space in the restroom 126 for persons that need extra space. Optionally, the first and/or second track 230, 232 may prohibit the partition wall 28 from contacting the first washbasin 142 by blocking additional movement towards the first washbasin 142. One or more latches 34 (shown in FIG. 1), detents, magnets, or the like may secure the partition wall 28 in the stowed position to prohibit unintentional movement of the partition wall 28 towards the deployed position.

In the illustrated embodiment, the partition wall 28 remains disposed within a footprint of the restroom 126 in the stowed position (at 270), in the deployed position (at 260), and when moving between the stowed position and the deployed position (e.g., at 262, 264, 266, and 268). In an example, a person (e.g., a crew member, employee, etc.) may be able to move the partition wall 28 by pushing or pulling the partition wall 28 with sufficient force to overcome the detents, latches 34, or the like that hold the partition wall 28 in the respective deployed and stowed positions. The movement from the stowed position back to the deployed position may be the reverse sequence as shown and described in FIG. 7. In the sequence of positions shown in FIG. 7, the center point of the partition wall 28, midway between the distal and proximal ends 152, 208, moves along a non-linear path as the partition wall 28 transitions between the stowed and deployed positions. The center point moves non-linearly due to the pivoting of the partition wall 28 as the partition wall 28 is translated along the tracks 230, 232. For example, the partition wall 28 generally slides to the side (towards the side wall 220), but also pivots so the orientation of the partition wall 28 changes (e.g., is not constant) relative to the surrounding elements in the restroom 126.

In an alternative embodiment, the second track 232 may be non-linear and shaped to cause the partition wall 28 to avoid fixtures such as the first washbasin 142. For example, a left segment of the second track 232 may curve, like the blade of a hockey stick extending from the shaft, in the longitudinal direction towards a back wall 272 of the restroom 126. The left segment of the first track 230 may also curve more drastically and extend farther towards the back wall 272. The result is that the defined path guides the partition wall 28 to bypass at least a portion of the first washbasin 142 in the stowed position because the partition wall 28 in the stowed position is located between the first washbasin 142 and the back wall 272.

Figure 8:
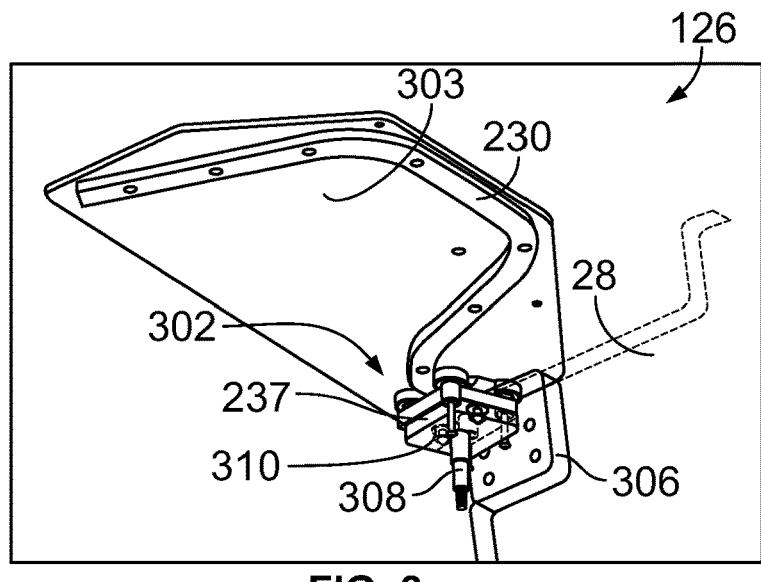
FIG. 8 is a perspective view of a first track assembly that includes a first track according to an embodiment.
Figure 9:
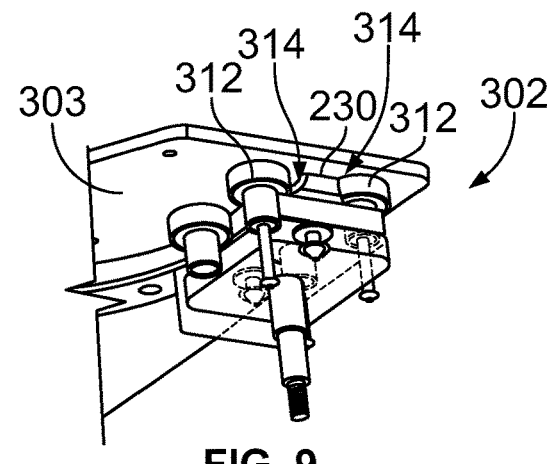
FIG. 9 is a perspective view of a carriage and the first track of the first track assembly according to an embodiment.

FIG. 8 is a perspective view of a first track assembly 302 that includes the first track 230 according to an embodiment. The first track assembly 302 may be mounted to the ceiling 303 of the restroom 126. The first track assembly 302 may include any mechanical linkage that enables the runner 237 to move along the track 230 with relatively low friction and noise. The runner 237 is disposed below the ceiling 303 in the illustrated embodiment, but may be mounted above the ceiling 303 in another embodiment to hide the runner 237 from view. FIGS. 8 and 9 show an example first track assembly 302. Other embodiments may have a different mechanism for the first track assembly 302. In FIG. 8, a bracket 306 on the partition wall 28 houses a pivot element 308 (e.g., a pin) that allows rotational movement. The pivot element 308 is coupled to a carriage 310 that represents the runner 237. The carriage 310 is secured to the track 230 and travels along the track 230 to move the partition wall 28.

FIG. 9 is a perspective view of the carriage 310 and the track 230 of the first track assembly 302 according to an embodiment. The track 230 may be mounted to the ceiling 303 and may drop down from the ceiling 303 at least a nominal distance (e.g., 2-5 cm). The carriage 310 includes roller wheels 312 that sandwich the track 230 and are received within corresponding races 314 of the track 230. Optionally, the carriage 310 may include a carriage pivot that enables the housing or truck of the carriage 310 to independently rotate relative to a body of the carriage 310. The carriage 310 may smoothly travel the defined path along the track 230.

Figure 10:
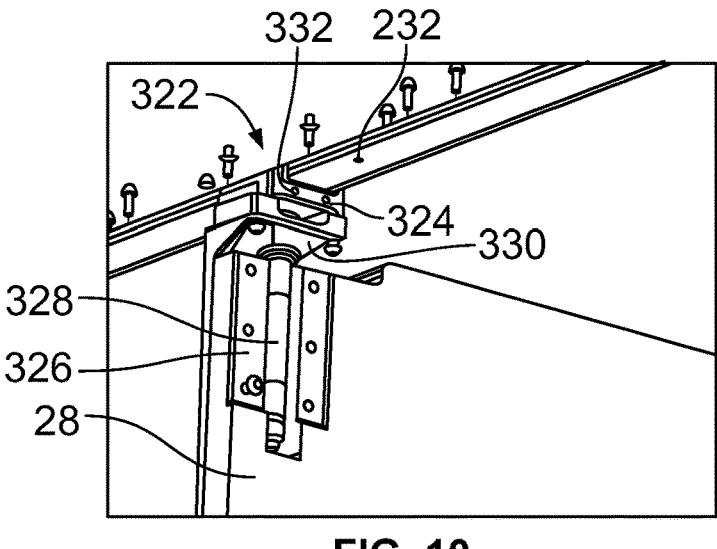
FIG. 10 is a perspective view of a second track assembly that includes a second track according to an embodiment.

FIG. 10 is a perspective view of a second track assembly 322 that includes the second track 232 according to an embodiment. The second track assembly 322 may be mounted to the ceiling 303 (shown in FIG. 9). The second track assembly 322 include any mechanical linkage that enables the runner 237 to move along the track 232 with relatively low friction and noise. FIG. 10 shows an example second track assembly 322. Other embodiments may have a different mechanism. A bracket 326 on the partition wall 28 houses a pivot element 328 (e.g., a pin) that allows rotational movement. The pivot element 328 is connected to a bearing bracket 330 and a bearing carriage 332. The bearing carriage 332 is free to move laterally along the second rail 232.

Figure 11:
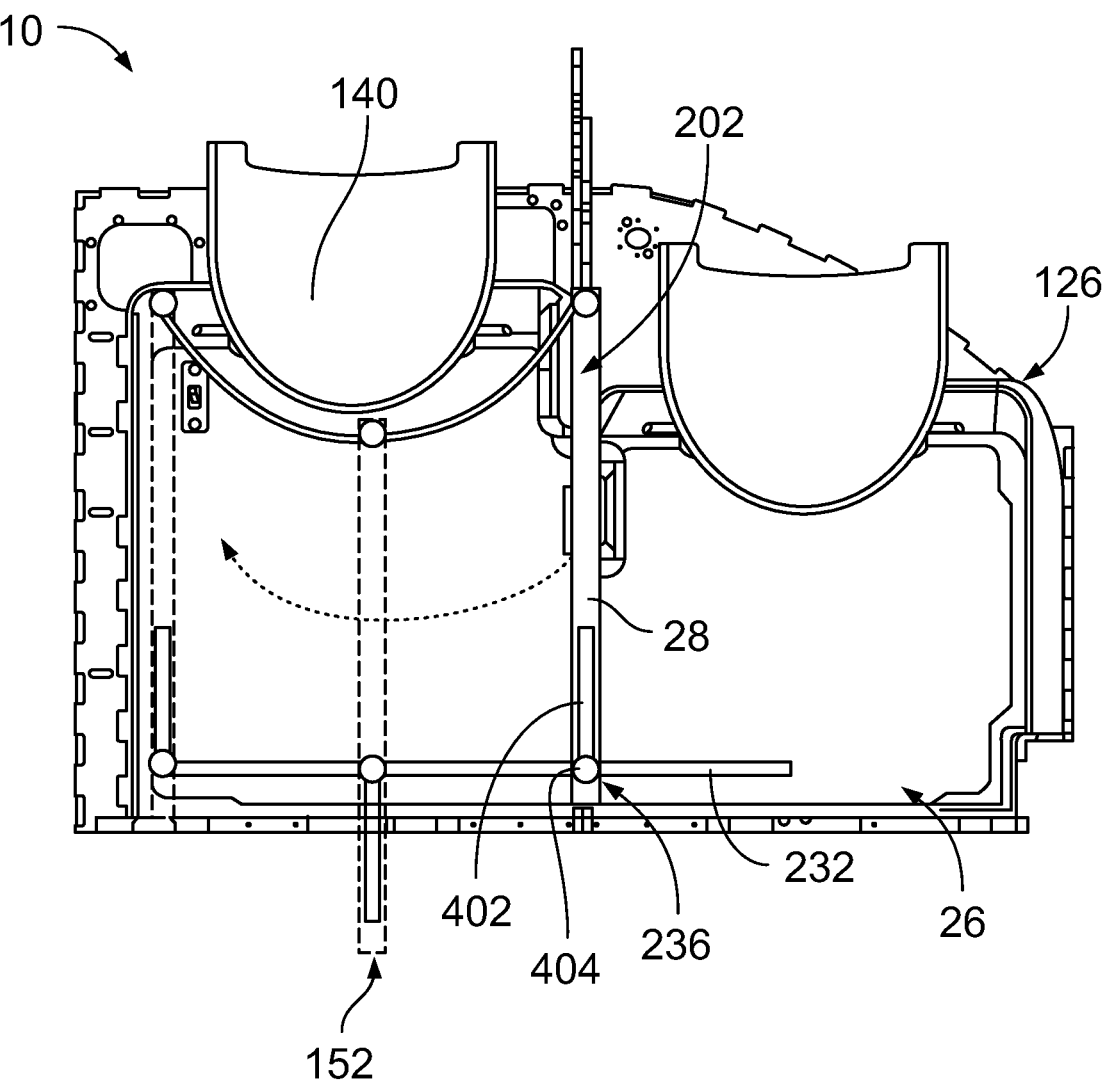
FIG. 11 illustrates the room reconfiguration system according to a second embodiment.

FIGS. 11-14 depict other embodiments of the room reconfiguration system 10. FIG. 11 illustrates the room reconfiguration system 10 according to a second embodiment. The second embodiment is like the first embodiment shown in FIGS. 4 through 10 with the primary difference being that the second connection point 236 between the partition wall 28 and the second track 232 can translate along a longitudinal length of the partition wall. For example, the partition wall 28 may include a track 402 that is at the top end 202 and is elongated to extend along the longitudinal length. The track 402 may be defined by a slot within the top end 202 of the partition wall 28. Alternatively, the track 402 may be defined by a bracket mounted to the top end 202. A pin 404 of the runner at the second connection point 236 may translate along the length of the track 402 during the transition of the partition wall 28 between the stowed and deployed positions. FIG. 11 shows three instantaneous positions of the partition wall 28, including the deployed position (on the right), the stowed position (on the left), and an intermediate position. The bottom end 204 (shown in FIG. 4) of the partition wall 28 may include a second track that is similar to and aligns with the track 402. A second pin of a second runner may translate along the length of the second track as the partition wall 28 transitions. As a result, when the partition wall 28 translates around the contour of the first toilet 140, the proximal end 152 of the partition wall may project beyond the second track 232 and across the entryway 26. The proximal end 152 may extend out of the footprint and/or perimeter of the restroom 126. The proximal end 152 may sweep through an aisle outside of the restroom 126 before retreating back into the footprint and/or perimeter of the restroom 126. Due to the sliding connection point 236, the partition wall 28 can transition between the deployed and stowed positions without rotating/pivoting. For example, the partition wall 28 may translate both laterally and longitudinally along the defined path. The angular orientation of the partition wall may be relatively constant during the transition, maintaining a constant orientation relative to the entryway 26 and the fixtures in the restroom 126.

Figure 12:
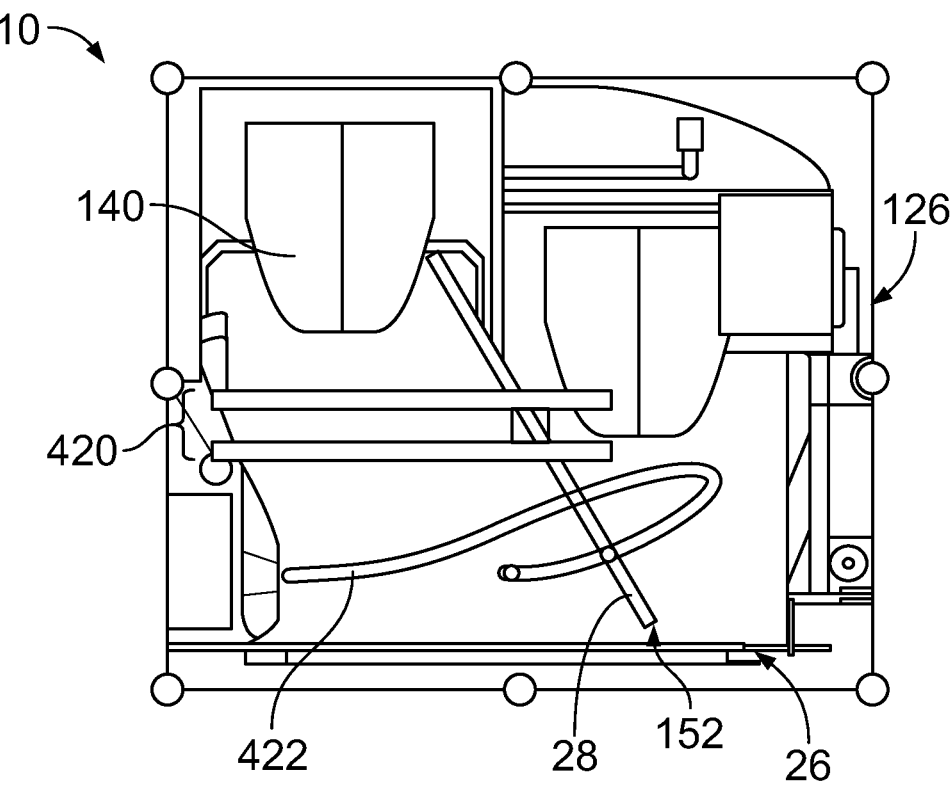
FIG. 12 illustrates the room reconfiguration system according to a third embodiment.

FIG. 12 illustrates the room reconfiguration system 10 according to a third embodiment. The third embodiment includes a non-linear track and a linear track, as in the first embodiment, but essentially switches the positions of the two tracks. For example, a linear track 420 is located proximate to the first toilet 140, and the non-linear track 422 is located proximate to the entryway 26. To allow the partition wall 28 to avoid the first toilet 140 during the transition to the stowed position, the linear track 420 may be generally centrally located along the ceiling 303 (shown in FIG. 8). For example, the linear track 420 may be positioned in front of the first toilet 140, in the space between the first toilet 140 and the entryway 26. The non-linear track 422 in FIG. 12 is generally hook-shaped to provide desired movement of the partition wall which avoids interior fixtures and remains within the footprint and/or perimeter of the restroom 126. For example, the non-linear track 422 allows the partition wall 28 to pivot as the proximal end 152 moves along the length of the non-linear track 422.

Figure 13:
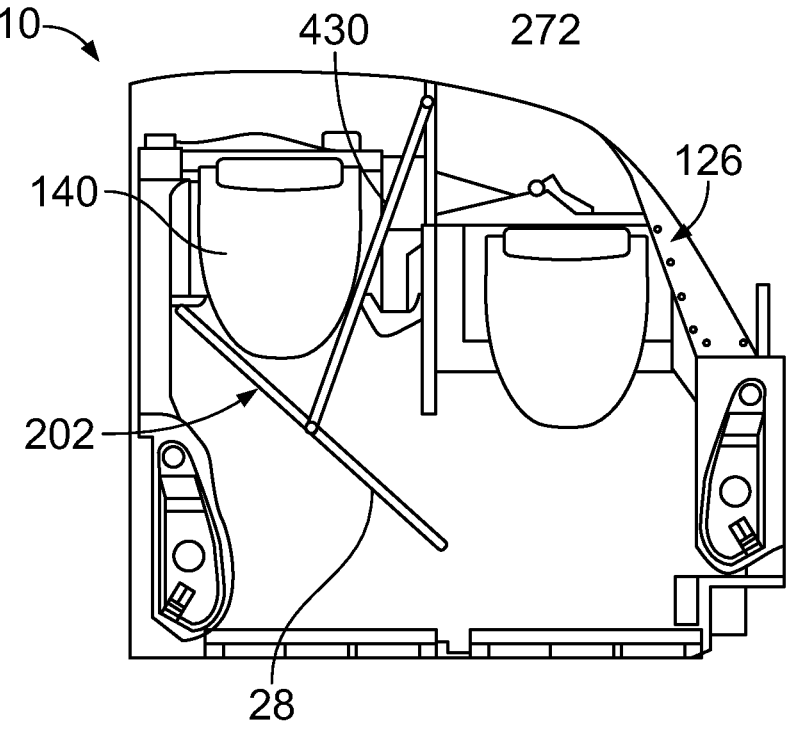
FIG. 13 illustrates the room reconfiguration system according to a fourth embodiment.

FIG. 13 illustrates the room reconfiguration system 10 according to a fourth embodiment. The fourth embodiment lacks tracks and instead uses at least a first pivoting cantilevered arm 430 to swing the partition wall 28 between the stowed and deployed positions. For example, the first pivoting cantilevered arm 430 may be mounted to the top end 202 of the partition wall 28. In an embodiment, a second pivoting cantilevered arm is mounted to the bottom end 204 (shown in FIG. 4) of the partition wall 28. The second pivoting cantilevered arm may align with the first pivoting cantilevered arm 430. The first cantilevered arm 430 may be vertically spaced apart from the second cantilevered arm. Each cantilevered arm may be secured to the back wall 272 of the restroom 126. Pivot points are located at each end of the cantilevered arms 430. The partition wall 28 can swing relative to the back wall 272 and rotate relative to the cantilevered arm 430 as the partition wall 28 is moved between the stowed and deployed positions, avoiding the first toilet 140.

Figure 14:
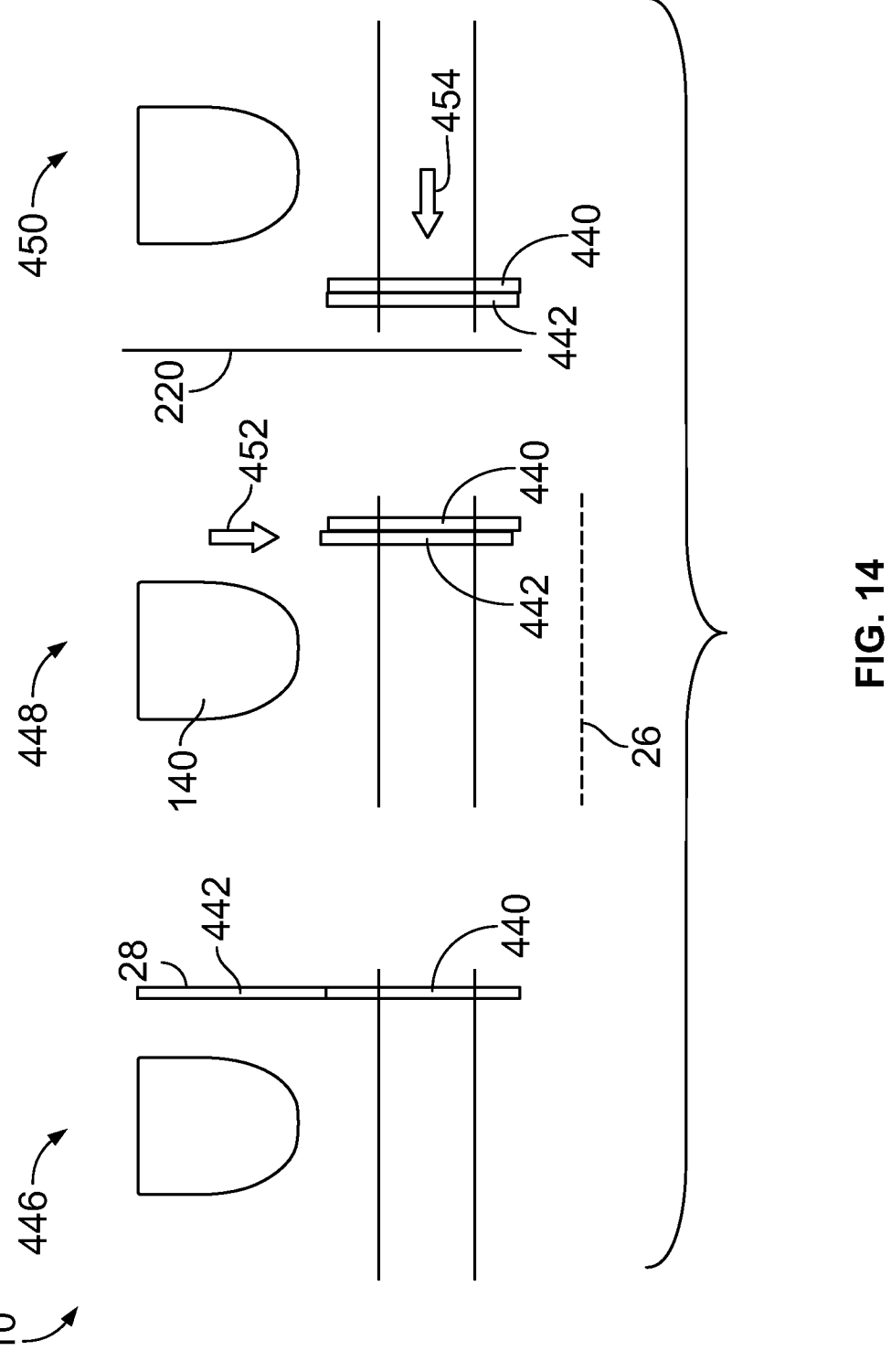
FIG. 14 illustrates the room reconfiguration system according to a fifth embodiment.

The partition wall 28 in one or more of the embodiments described above may have a solid, rigid composition that does not include fold lines or hinges. In an alternative embodiment, the partition wall may include multiple panels that are collinear in the deployed position and are stacked in an overlapping fashion in the stowed position or at least during the transition between the deployed and stowed positions. For example, FIG. 14 illustrates the room reconfiguration system 10 according to a fifth embodiment. The partition wall 28 in the fifth embodiment includes two discrete panels 440, 442 that can slide relative to each other. The deployed position is shown to the left as indicated by reference number 444. From the deployed position, a distal panel 442 of the two panels can slide towards the entryway 26 to an overlapping position that overlaps a proximal panel 440 of the two panels. The stacked panels 440, 442 may be located in front of the first toilet 140 (e.g., between the first toilet 140 and the entryway 26) in the intermediate position indicated by reference number 448. Then, the stacked panels 440, 442 can be laterally translated towards the side wall 220 to achieve the stowed position, as indicated by reference number 450. The transition to the stowed position may include a first longitudinal translation of the distal panel 442 in a proximal direction 452 (e.g., towards the entryway 26) to overlap the proximal panel 440, followed by sliding the stacked, overlapping panels 440, 442 in a lateral direction 454 towards the side wall 220.

Optionally, in one or more alternative embodiments, the partition wall 28 may include one or more hinges. For example, the partition wall may have two panels connected to each other via a vertical hinge. A distal panel and a proximal panel of the partition wall can fold or bend relative to each other. The distal panel optionally may include a cut out portion that accommodates a knee wall that is permanently fixed in place and mounted at or proximate to the floor. The panels may be connected to tracks that are not parallel to each other, which causes the panels to bend or pivot relative to each other as the partition wall is moved to the stowed position to achieve the stowed position without contacting the fixtures. Alternatively, at least one of the tracks may be non-linear and shaped to cause the distal panel to move around the contour of the first toilet without the need for a cut out.

In another alternative embodiment, the partition wall may include a first vertical hinge and a second vertical hinge to subdivide the partition wall into at least three panels. The second hinge may enable the partition wall to better conform to the interior geometry of the restroom than having only one hinge or no hinge. In yet another alternative embodiment, the partition wall may include two panels connected by a full-length vertical hinge. The partition wall may be mounted to tracks on the ceiling. The distal panel may fold towards the proximal panel to avoid the first toilet as the partition wall is translated from the deployed position towards the stowed position.

A benefit of one or more of the embodiments described herein may include eliminating permanent obstacles and obstructions in the area between the two areas. For example, when the partition wall is in the stowed position, a user can freely move in the space between the toilets without the risk of tripping or catching a wheelchair wheel on a permanent obstacle that is associated with the partition wall. For example, some conventional moveable partition walls align with a knee wall when in the deployed position. The knee wall is a permanent structure that forms an extension of the partition wall in the deployed position. The presence of the knee wall allows the movable portion of the partition wall to transition to the stowed position without interfering with the toilet. The presence of a knee wall could restrict movement of the user in the combined space. Alternatively, an embodiment of the room reconfiguration system described herein may include a knee wall, but the knee wall is smaller and less obtrusive than known knee walls to avoid obstructing movement of the user.

In an alternative embodiment, the partition wall may be attached to the restroom structure by two rails and may laterally translate along the rails. Optionally, the partition wall may include a cut out portion or knee wall to avoid contacting the first toilet. The track that is closest to the back wall may include a linear segment and a curved segment at the left end of the track (e.g., corresponding to the stowed position). The curved segment may allow the partition wall to stow close to the side wall in the stowed position.

Figure 15:
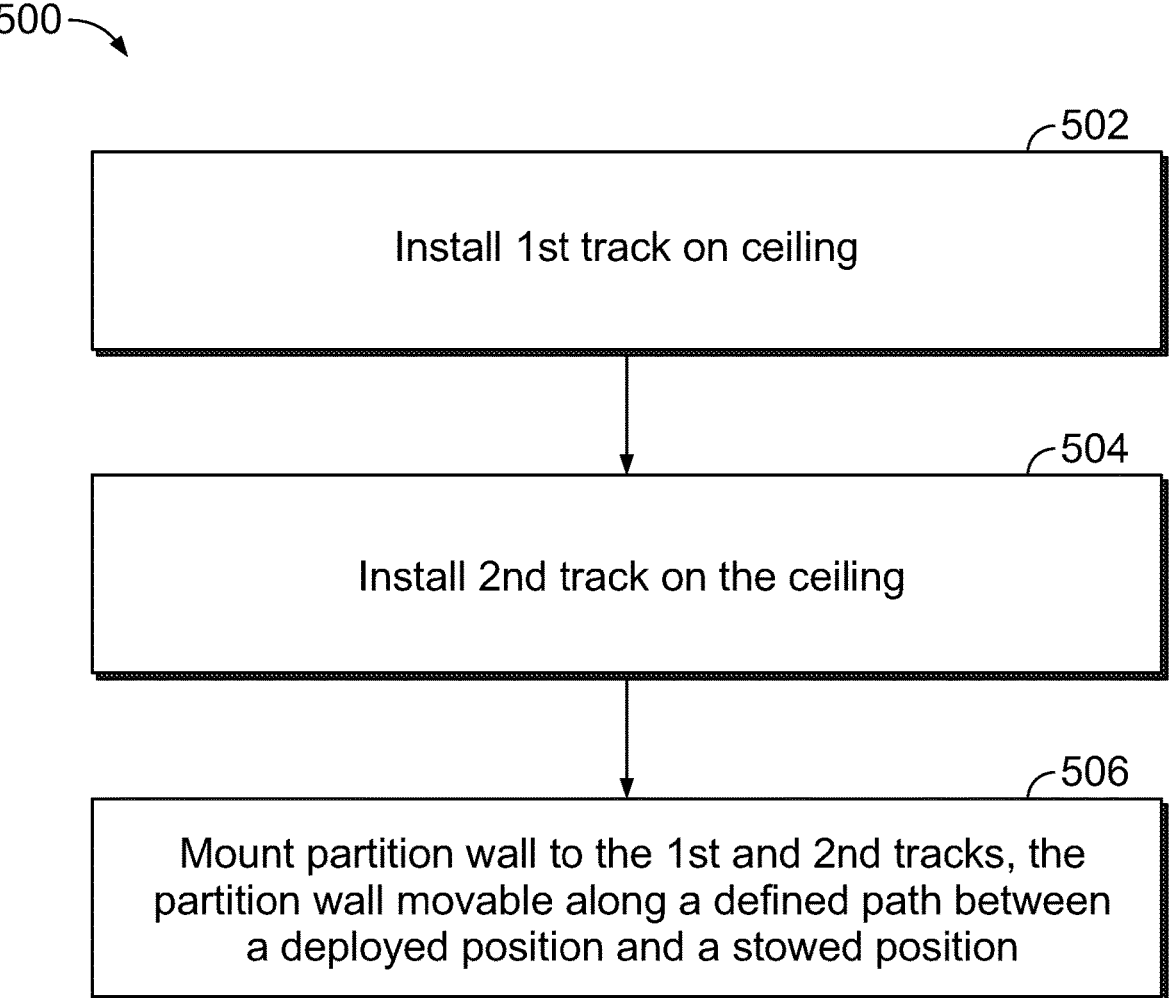
FIG. 15 is a flow chart of a method for providing a reconfigurable room according to an embodiment.

FIG. 15 is a flow chart 500 of a method for providing a reconfigurable room according to an embodiment. The method may be performed to achieve the room reconfiguration system 10 according to one or more of the embodiments described herein. Optionally, the method may include additional steps, different steps, and/or the steps may be performed in a different order than as shown and described with reference to FIG. 15.

At step 502, a first track 230 is installed on a ceiling 303 of a room 12. At step 504, a second track 232 is installed on the ceiling 303 of the room 12. The two tracks 230, 232 are spaced apart from each other. The tracks 230, 232 provide a defined path for controlling movement of a partition wall 28. At step 506, the partition wall 28 is mounted to the first and second tracks 230, 232. The partition wall 28 is movable along the defined path between a deployed position and a stowed position. In the deployed position, the partition wall 28 divides the room 12 into two discrete areas 18, 22. The partition wall 28 in the stowed position defines a combined area 30 in place of the two discrete areas 18, 22. The partition wall 28 may be mounted to the tracks 230, 232 via respective runners 237. The runners 237 may slide along the tracks 230, 232 as the partition wall 28 moves along the defined path. In an embodiment, the first and second tracks 230, 232 may not be parallel to each other. The partition wall 28 may move along the defined path by translating as well as pivoting. For example, the partition wall 28 may be mounted to the tracks 230, 232 at first and second connection points 234, 236, respectively, that are rotatable to permit the partition wall 28 to pivot.

In an example, the room 12 is a restroom 126. The restroom 126 may be located in an aircraft 100. The two discrete areas 18, 22 represent two different stalls, each having a respective toilet 140, 144 and washbasin 142, 146. In the deployed position, the partition wall 28 may be disposed between the two stalls (e.g., between the two toilets 140, 144) to provide privacy. In the stowed position, the partition wall 28 may be located at or proximate to a side wall 220 of the restroom 126, no longer between the toilets

140, 144. In an example, the defined path may cause the partition wall 28 to move non-linearly around a front portion of the first toilet 140 without contacting the first toilet 140. For example, the first track 230 may have a non-linear shape that curves around a contour of the first toilet 140. Optionally, the defined path may cause the partition wall 28 to stay within a footprint of the restroom 126 as it moves between the stowed and deployed positions.

Further, the disclosure comprises examples according to the following clauses:

Clause 1. A lavatory comprising:

a partition wall movable along a defined path between a deployed position in which the partition wall divides the lavatory into two discrete areas and a stowed position that defines a combined area in place of the two discrete areas, wherein the partition wall translates along the defined path between the deployed position and the stowed position.

Clause 2. The lavatory of Clause 1, wherein the partition wall is coupled to a first track and a second track that are both mounted along a ceiling of the lavatory, the first and second tracks providing the defined path for the partition wall.

Clause 3. The lavatory of Clause 2, wherein the partition wall is coupled to the first track at a first connection point and is coupled to the second track at a second connection point, the partition wall rotatable at each of the first and second connection points.

Clause 4. The lavatory of Clause 2, wherein the first track is non-linear.

Clause 5. The lavatory of Clause 4, wherein the second track is linear.

Clause 6. The lavatory of Clause 4, wherein the first track is shaped and positioned to cause the partition wall to translate around a contour of at least one fixture in the lavatory without the partition wall contacting the at least one fixture.

Clause 7. The lavatory of any of Clauses 1-6, wherein the partition wall is configured to translate towards a side wall of the lavatory and rotate about a vertical axis of the partition wall during movement along the defined path between the deployed position and the stowed position.

Clause 8. The lavatory of any of Clauses 1-7, wherein the partition wall remains disposed within a footprint of the lavatory in the stowed position, in the deployed position, and when moving between the stowed position and the deployed position.

Clause 9. The lavatory of any of Clauses 1-8, wherein, in the stowed position, the partition wall is disposed proximate to a side wall of the lavatory, the side wall adjacent to an entryway of the lavatory.

Clause 10. The lavatory of any of Clauses 1-9, further comprising a first toilet in a first area of the two discrete areas and a second toilet in a second area of the two discrete areas, wherein, when the partition wall is in the stowed position, a floor of the lavatory is free of any obstruction between the first toilet and the second toilet.

Clause 11. The lavatory of any of Clauses 1-10, further comprising a first toilet in a first area of the two discrete areas and a second toilet in a second area of the two discrete areas, wherein the defined path is configured to cause a distal end of the partition wall to non-linearly move along a contour of the first toilet without contacting the first toilet.

Clause 12. The lavatory of any of Clauses 1-11, wherein the partition wall is configured to move between the stowed and deployed positions without bending or folding.

Clause 13. The lavatory of any of Clauses 1-12, wherein the defined path traversed by the partition wall between the stowed and deployed positions is non-linear.

Clause 14. The lavatory of any of Clauses 1-13, wherein the partition wall includes a magnet at a bottom end of the partition wall and the lavatory comprises a magnetic track disposed below a floor of the lavatory, the magnetic track including a ferrous material that interacts with the magnet in the partition wall.

Clause 15. An aircraft comprising:

a lavatory, the lavatory comprising:

first toilet;

a second toilet; and a partition wall configured to translate along a defined path between a deployed position and a stowed position, wherein the partition wall in the deployed position is disposed between the first and second toilets, and, when the partition wall is in the stowed position, the first toilet is disposed between the partition wall and the second toilet to provide a larger open space relative to when the partition wall is in the deployed position.

Clause 16. The aircraft of Clause 15, wherein the defined path causes the partition wall to translate towards a side wall of the lavatory and rotate about a vertical axis of the partition wall during movement between the deployed position and the stowed position.

Clause 17. The aircraft of Clause 15 or Clause 16, wherein the defined path of the partition wall is configured to cause a distal end of the partition wall to non-linearly translate along a contour of the first toilet without contacting the first toilet.

Clause 18. The aircraft of any of Clauses 15-17, wherein the lavatory is disposed within a passenger cabin of the aircraft.

Clause 19. The aircraft of any of Clauses 15-18, wherein the partition wall is coupled to a first track and a second track that are mounted along a ceiling of the lavatory, the first and second tracks providing the defined path for the partition wall, wherein the first track is non-linear.

Clause 20. A method comprising:

installing a first track on a ceiling of a lavatory;

installing a second track on the ceiling of the lavatory; and mounting a partition wall to the first track and the second track such that the partition wall is movable along a defined path that is defined by the first and second tracks, wherein the partition wall is movable along the defined path between a deployed position and a stowed position, the partition wall in the deployed position configured to divide the lavatory into two discrete areas, the partition wall in the stowed position config- ured to define a combined area in place of the two discrete areas.

While various spatial and direction terms such as top, bottom, lower, mid, lateral, horizontal, vertical, front and the like can be used to describe embodiments of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) can be used in combination with each other. In addition, many modifications can be made to adapt a particular situation or material to the teachings of the various embodi- ments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "compris- ing" and "wherein." Moreover, the terms "first," "second," and "third." etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, includ- ing making and using any devices or systems and perform- ing any incorporated methods. The patentable scope of the various embodiments of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal lan- guage of the claims.

What is claimed is:

1. A lavatory comprising:

a partition wall movable along a defined path between a deployed position in which the partition wall divides the lavatory into two discrete areas and a stowed position that defines a combined area in place of the two discrete areas, wherein the partition wall translates along the defined path between the deployed position and the stowed position, and wherein the partition wall is configured to move between the stowed and deployed positions without bending or folding.

2. The lavatory of claim 1, wherein the partition wall is coupled to a first track and a second track that are both mounted along a ceiling of the lavatory, the first and second tracks providing the defined path for the partition wall.

3. The lavatory of claim 2, wherein the partition wall is coupled to the first track at a first connection point and is coupled to the second track at a second connection point, the partition wall rotatable at each of the first and second connection points.

4. The lavatory of claim 2, wherein the first track is non-linear.

5. The lavatory of claim 4, wherein the second track is linear.

6. The lavatory of claim 4, wherein the first track is shaped and positioned to cause the partition wall to translate around a contour of at least one fixture in the lavatory without the partition wall contacting the at least one fixture.

7. The lavatory of claim 1, wherein the partition wall is configured to translate towards a side wall of the lavatory and rotate about a vertical axis of the partition wall during movement along the defined path between the deployed position and the stowed position.

8. The lavatory of claim 1, wherein the partition wall remains disposed within a footprint of the lavatory in the stowed position, in the deployed position, and when moving between the stowed position and the deployed position.

9. The lavatory of claim 1, wherein, in the stowed position, the partition wall is disposed proximate to a side wall of the lavatory, the side wall adjacent to an entryway of the lavatory.

10. The lavatory of claim 1, further comprising a first toilet in a first area of the two discrete areas and a second toilet in a second area of the two discrete areas, wherein, when the partition wall is in the stowed position, a floor of the lavatory is free of any obstruction between the first toilet and the second toilet.

11. The lavatory of claim 1, further comprising a first toilet in a first area of the two discrete areas and a second toilet in a second area of the two discrete areas, wherein the defined path is configured to cause a distal end of the partition wall to non-linearly move along a contour of the first toilet without contacting the first toilet.

12. The lavatory of claim 1, wherein the defined path traversed by the partition wall between the stowed and deployed positions is non-linear.

13. The lavatory of claim 1, wherein the partition wall includes a magnet at a bottom end of the partition wall and the lavatory comprises a magnetic track disposed below a floor of the lavatory, the magnetic track including a ferrous material that interacts with the magnet in the partition wall.

14. An aircraft comprising:
a lavatory, the lavatory comprising:
first toilet;
a second toilet; and
a partition wall configured to translate along a defined path between a deployed position and a stowed position, wherein the partition wall is configured to move between the stowed and deployed positions without bending or folding, wherein the partition wall in the deployed position is disposed between the first and second toilets, and, when the partition wall is in the stowed position, the first toilet is disposed between the partition wall and the second toilet to provide a larger open space relative to when the partition wall is in the deployed position.

15. The aircraft of claim 14, wherein the defined path causes the partition wall to translate towards a side wall of the lavatory and rotate about a vertical axis of the partition wall during movement between the deployed position and the stowed position.

16. The aircraft of claim 14, wherein the defined path of the partition wall is configured to cause a distal end of the partition wall to non-linearly translate along a contour of the first toilet without contacting the first toilet.

17. The aircraft of claim 14, wherein the lavatory is disposed within a passenger cabin of the aircraft.

18. The aircraft of claim 14, wherein the partition wall is coupled to a first track and a second track that are mounted along a ceiling of the lavatory, the first and second tracks providing the defined path for the partition wall, wherein the first track is non-linear.

19. A method comprising:
installing a first track on a ceiling of a lavatory;
installing a second track on the ceiling of the lavatory; and
mounting a partition wall to the first track and the second track such that the partition wall is movable along a defined path that is defined by the first and second tracks, wherein the partition wall is movable along the defined path between a deployed position and a stowed position, the partition wall in the deployed position configured to divide the lavatory into two discrete areas, the partition wall in the stowed position configured to define a combined area in place of the two discrete areas, wherein the partition wall is configured to move between the stowed and deployed positions without bending or folding.

20. The aircraft or claim 14, wherein the partition wall is a rigid, single, solid body panel having no portion that is bendable or foldable, wherein the partition wall is devoid of fold lines and hinges, and wherein the partition wall in the deployed position and the stowed position is contained within the lavatory.

* * * * *